(12) United States Patent
Dorgelo et al.

(10) Patent No.: US 7,650,198 B2
(45) Date of Patent: Jan. 19, 2010

(54) AUTOMATION SYSTEM UNIFIED DATA ACCESS FOR DISPARATE DATA SOURCES

(75) Inventors: Eric G. Dorgelo, Port Moody (CA); Kevin G. Gordon, Annacis Island Delta (CA); Clifton H. Bromley, New Westminister (CA); Douglas J. Reichard, Fairview, OH (US); Marc D. Semkow, Burnaby (CA); Shafin A. Virji, Vancouver (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 70 days.

(21) Appl. No.: 11/241,534

(22) Filed: Sep. 30, 2005

(65) Prior Publication Data

US 2007/0078555 A1 Apr. 5, 2007

(51) Int. Cl.
   *G06F 19/00* (2006.01)
(52) U.S. Cl. .................. 700/108; 700/52; 702/182; 702/183; 702/185; 702/188
(58) Field of Classification Search .............. 700/1, 700/52, 108; 702/182–183, 185, 188
See application file for complete search history.

(56) References Cited

U.S. PATENT DOCUMENTS

| 6,298,377 | B1 | 10/2001 | Hartikainen et al. |
| 6,424,881 | B1 | 7/2002 | Steffan et al. |
| 6,496,751 | B1 | 12/2002 | Salvo et al. |
| 6,505,247 | B1 * | 1/2003 | Steger et al. ............... 709/224 |
| 6,681,198 | B2 * | 1/2004 | Buote et al. ............... 702/185 |
| 6,826,483 | B1 | 11/2004 | Anderson et al. |
| 6,862,486 | B2 | 3/2005 | Cocco et al. |
| 6,968,303 | B1 | 11/2005 | Wang et al. |
| 6,985,779 | B2 * | 1/2006 | Hsiung et al. ............... 700/19 |
| 2005/0010660 | A1 | 1/2005 | Vaught |
| 2005/0033802 | A1 | 2/2005 | Pauly et al. |
| 2006/0161268 | A1 * | 7/2006 | Frensch et al. ............... 700/1 |
| 2006/0173568 | A1 * | 8/2006 | Jackson et al. ............... 700/108 |

\* cited by examiner

*Primary Examiner*—Michael D Masinick
(74) *Attorney, Agent, or Firm*—Turocy & Watson LLP; Alexander R. Kuszewski

(57) ABSTRACT

Historical and real-time data access is leveraged to provide unified data access for interacting with manufacturing process entities such as, for example, process overview displays, charting systems, reporting systems, logging systems, and/or recipe systems and the like. The unified data, for example, allows for playback of historical process overviews for a user selected period of time. In one instance, a "VCR like" user interface can be employed to allow 'rewinding' and 'replaying' of a historical process overview. This facilitates in proper monitoring and/or troubleshooting of manufacturing processes. The unified availability of past and current data also enables reporting systems to provide "living" reports that automatically update with real-time data. This can allow for efficient comparison of current data with historical data for a given manufacturing process.

18 Claims, 11 Drawing Sheets

AUTOMATION SYSTEM UNIFIED DATA ACCESS FOR DISPARATE DATA SOURCES

TECHNICAL FIELD

The subject matter herein relates generally to industrial automation and, more particularly, to systems and methods for providing unified data access for disparate data servers associated with manufacturing process data.

BACKGROUND

During the early industrial revolution, machines were integrated into the work environment to speed up the manufacturing of goods. The utilization of machines allowed production numbers to increase well beyond what human labor alone would allow. This caused an exponential growth period for most companies as the drastically lower price of goods initiated by the lower cost of production increased sales dramatically. Soon, most manufacturers were clamoring to have their factories "modernized" as well. For some of the manufacturers, simple steam driven power sources utilizing leather belts enabled them to increase production and minimize human labor. However, a great deal of the manufacturing still required great dexterity and, thus, human labor remained invaluable for those types of processes.

Eventually, however, more complex manufacturing machines were created that required complex control systems to operate. These were burdensome to maintain and control, but they gave their owners the ability to replace human labor with more efficient machines. The complexity of the controls eventually drove the manufacturers to employ computers to facilitate in controlling and monitoring these complex systems. And, in order to control the complex control systems, human interfaces were developed to allow the human labor force to interact with the machines.

Human/machine interfaces (HMIs) or simply user interfaces are important to the successful operation and maintenance of industrial automation devices and equipment. User interfaces provide the essential communication link between operators and automation devices. This link allows operators to, among other things, setup devices, monitor device status during operation, as well as analyze device health. Without such user interfaces, high level industrial automation would be difficult if not impossible to achieve.

These types of interfaces allow operators (i.e., users) to easily interact with manufacturing processes on a real-time data basis. To review historical data, the user must select a different display that typically generates a chart type display of the historical data. Often this includes an x-y Cartesian charting system that the user must interpret to determine what a like parameter value is for a current display. If the display can only display one format at a time, the user must constantly switch back and forth between the displays, often losing track of the desired data point. This type of interfacing creates substantial hardships when attempting to troubleshoot a manufacturing process when problems occur.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to industrial automation and, more particularly, to systems and methods for providing unified data access for disparate data sources associated with a manufacturing process. Historical and real-time data access is leveraged to provide unified data access for interacting with manufacturing process entities such as, for example, process overview displays, charting systems, reporting systems, logging systems, and/or recipe systems and the like. The unified data, for example, allows for playback of historical process overviews for a user selected period of time. In one instance, a "VCR like" user interface can be employed to allow 'rewinding' and 'replaying' of a historical process overview. This facilitates in proper monitoring and/or troubleshooting of manufacturing processes. The unified availability of past and current data also enables reporting systems to provide "living" reports that automatically update with real-time data. This can allow for efficient comparison of current data with historical data for a given process. By providing unified data, reports, charts, overviews, and the like, for example, can be employed to significantly enhance their diagnostic capabilities by providing both historic and real-time data in substantially similar formats. This allows users to quickly ascertain differences between historic and current data without requiring them to decipher raw data and/or to interpret differing data formats, substantially increasing diagnostic accuracy and efficiency.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
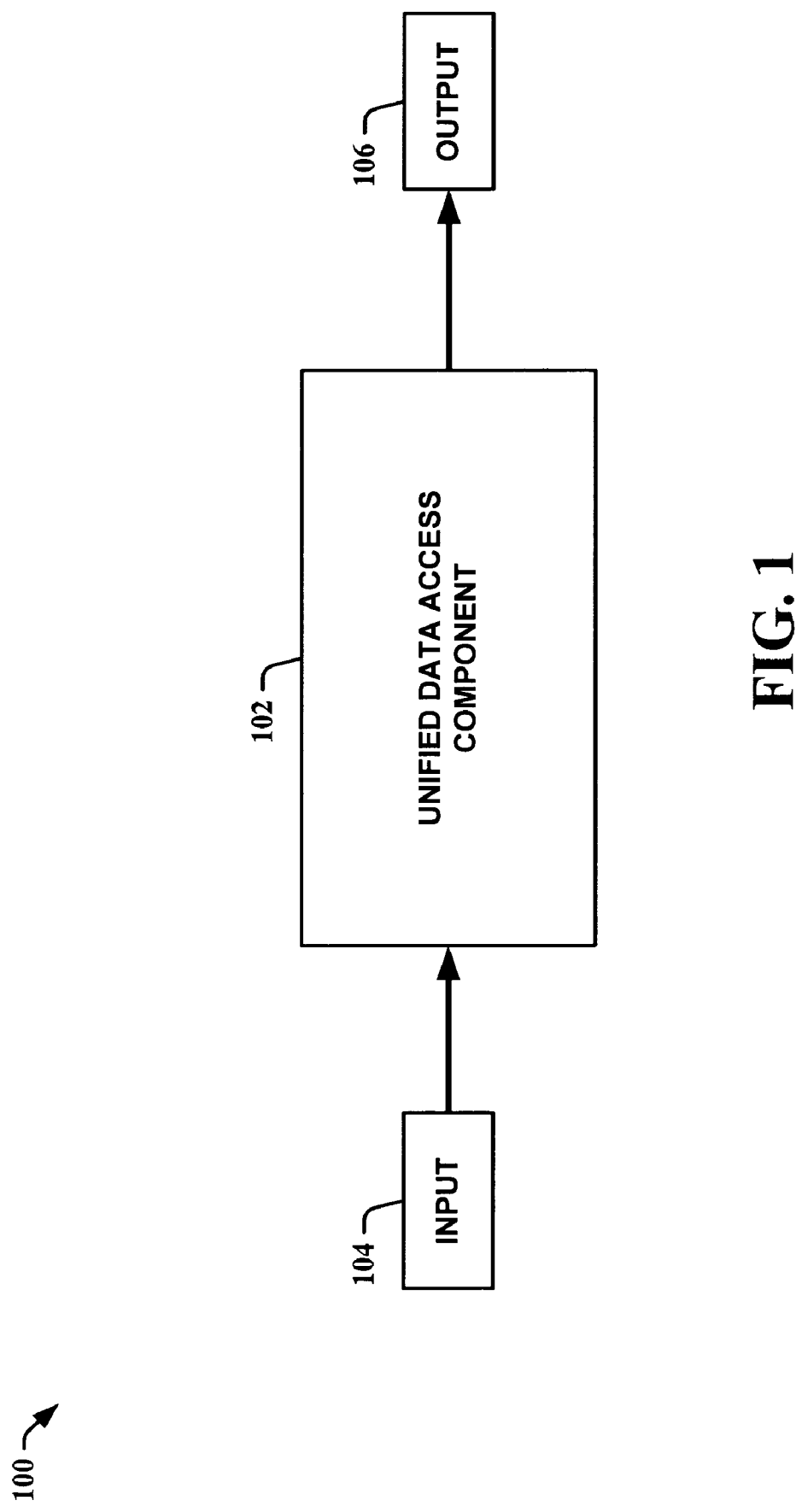
FIG. 1 is a block diagram of a unified data access system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Furthermore, the subject matter may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject matter.

Systems and methods are provided that allow for unifying the access to disparate historical and/or real-time data servers for manufacturing process data. Systems and subsystems associated with manufacturing processes can obtain both historical and real-time data from a "unified data access" (UDA) system that allows seamless access to either type of data from the calling application and/or system/subsystem. The UDA system abstracts the differences between the disparate data sources via a single component that provides the seamless access to manufacturing process data (real-time and/or historical). This allows manufacturing process related systems/subsystems to now employ both historical and real-time data in their applications without complicated reconfigurations of displays and the like. For example, a manufacturing process overview display can now be utilized to show not only real-time data, but historical data as well, utilizing substantially the same display format, allowing for easier interpretation by a user when maintaining and/or troubleshooting a manufacturing process.

In FIG. 1, a block diagram of a unified data access system 100 in accordance with an aspect of an embodiment is shown. The unified data access system 100 is comprised of a unified data access component 102 that receives an input 104 and provides an output 106. The input 104 typically consists of data that is retrieved from disparate data sources such as, for example, historical data sources and/or real-time data sources in response to a data request. The historical data sources can include, but are not limited to, data servers, databases, and/or data files and the like. The real-time data sources can include, but are not limited to, manufacturing processes and/or buffered process data (e.g., current data in random access memory (RAM) and the like). The disparate data sources can be remote and/or local to the unified data access component 102. The unified data access component 102 retrieves the disparate data by employing different data access protocols for each data type. The unified data retrieved from the disparate data sources is then provided as an output 106. This is accomplished by providing a unified data access interface that can be easily interfaced with existing manufacturing process applications, systems, and/or subsystems and the like. This allows manufacturing process related entities to employ the unified data to facilitate information dissemination in a more user-friendly manner (e.g., utilizing similar display formats for historical and real-time data, etc.)

Figure 2:
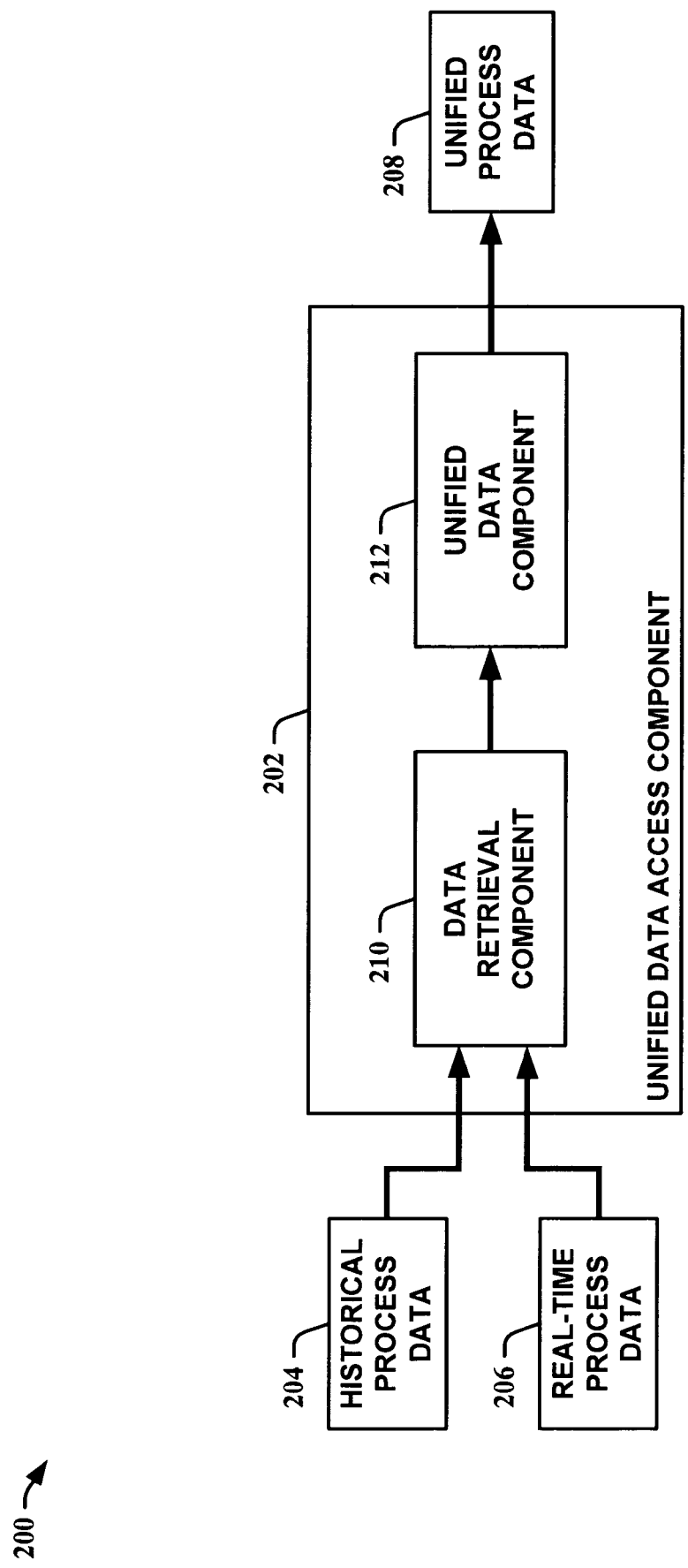
FIG. 2 is another block diagram of a unified data access system in accordance with an aspect of an embodiment.

Turning to FIG. 2, another block diagram of a unified data access system 200 in accordance with an aspect of an embodiment is depicted. The unified data access system 200 is comprised of a unified data access component 202 that retrieves historical process data 204 and/or real-time process data 206 and provides unified process data 208. The unified data access component 202 is comprised of a data retrieval component 210 and a unified data component 212. The data retrieval component 210 retrieves the historical process data 204 and/or the real-time process data 206 from disparate data sources based on a data request. The unified data component 212 obtains the historical process data 204 and/or the real-time process data 206 from the data retrieval component 210 and unifies the data to provide the unified process data 208.

The unified process data 208 can be employed and/or used in conjunction with manufacturing process related entities such as, for example, data logging systems, reporting systems, charting systems, process overview displays, statistical analysis systems, and/or recipe systems and the like. This substantially increases the utility of these systems and provides features that are not possible without utilizing the systems and methods herein. For example, comparative data can now be easily disseminated to users because both current (real-time) and historical data are readily available from a single source without requiring substantial reconfiguration of the dissemination method (e.g., a process overview display format can be modified to show current and historical data for a given time (e.g., comparing data obtained 24 hours apart, comparing data obtained the same day of the week from a prior week, etc.), a report can show historical and "live" (real-time) data on the same report for easy comparison, etc.).

Figure 3:
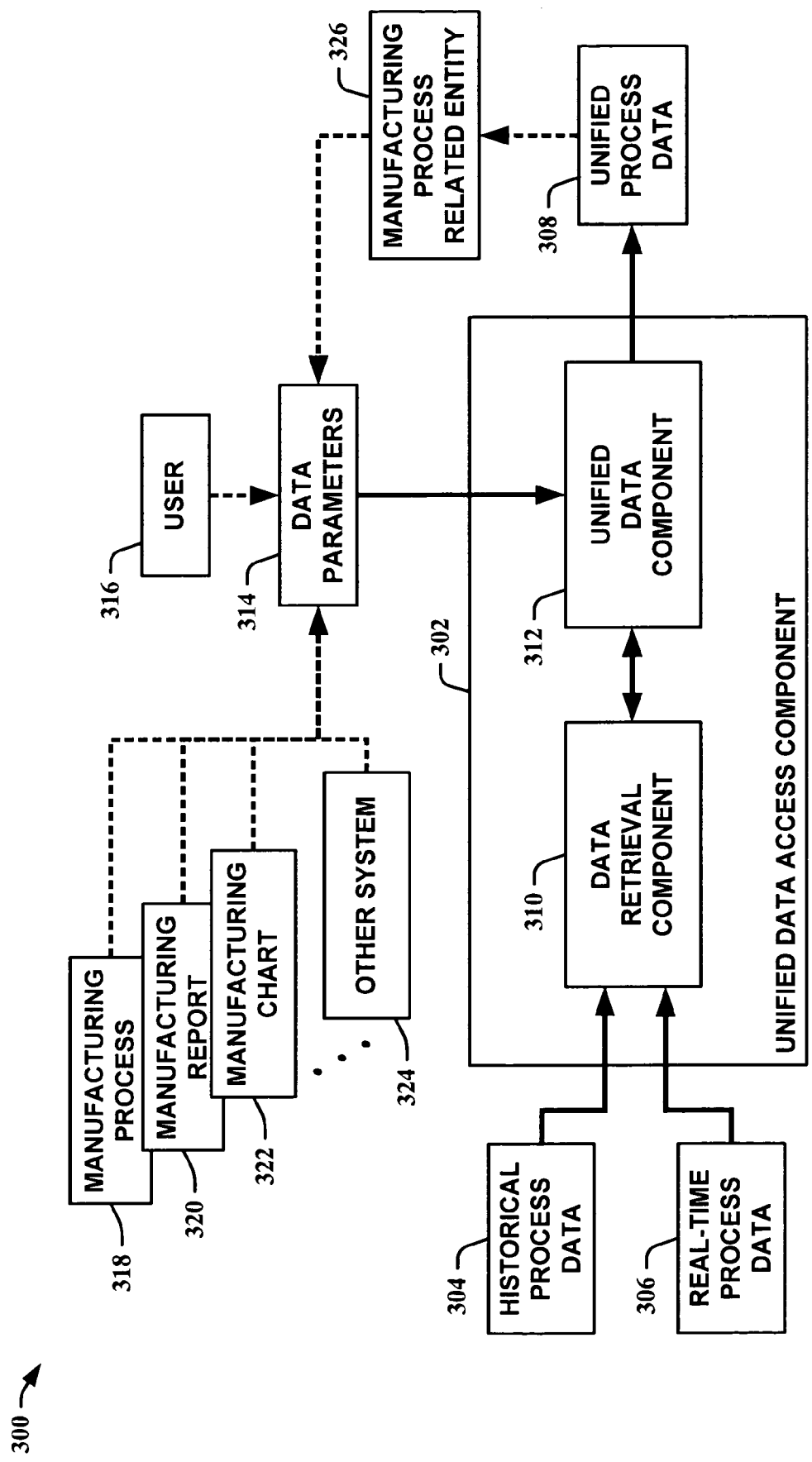
FIG. 3 is yet another block diagram of a unified data access system in accordance with an aspect of an embodiment.

Looking at FIG. 3, yet another block diagram of a unified data access system 300 in accordance with an aspect of an embodiment is illustrated. The unified data access system 300 is comprised of a unified data access component 302 that retrieves historical process data 304 and/or real-time process data 306 and provides unified process data 308. The unified data access component 302 is comprised of a data retrieval component 310 and a unified data component 312. The data retrieval component 310 retrieves the historical process data 304 and/or the real-time process data 306 from disparate data sources based on data parameters 314 that formulate a data request from the unified data component 312. The unified data component 312 then obtains the historical process data 304 and/or the real-time process data 306 from the data retrieval component 310 and unifies the data to provide the unified process data 308 in response to the data parameters 314. In a typical instance of the unified data access system 300, the data parameters 314 and the unified process data 308 are received and transmitted via a unified data access interface (e.g., UDA application programming interface (API)).

The data parameters 314 can include, but are not limited to, specific data type requests, data requests for a specific time period, data related to a specific manufacturing process function, and/or data related to a specific time-of-the-day/week/month/year, etc, and the like. This allows data requests such as, for example, 'display historical data process overview from around 12pm yesterday' and the like. The historical process overview can then be "replayed" for the operator (i.e., user) of the manufacturing process overview display. The unified data access system 300 also illustrates optional data request sources for the data parameters 314. Thus, the data request can come from such optional sources as, for example, a user 316, manufacturing related systems/subsystems 318-324, and/or manufacturing process related entity 326 and the like. In this UDA subsystem 300, the optional manufacturing process related entity 326 is requesting data as well as receiving the unified process data 308. Thus, in some instances, the recipient of the unified process data 308 can base a data request, in whole or in part, on the received unified process data 308. In other instances, the recipient of the unified process data 308 can request data without basing it, in whole or in part, on the received unified process data 308.

In the UDA subsystem 300, the optional manufacturing related systems/subsystems 318-324 represent manufacturing process related entities that are not receiving the unified process data 308. In this example, the manufacturing related systems/subsystems 318-324 are comprised of a manufacturing process system 318, a manufacturing report system 320, a manufacturing chart system 322, and other system 324. Other system 324 represents additional systems that are not expressly called out but can still facilitate in requesting data from the UDA system 300. For example, manufacturing process system 318 can be an auxiliary system to the manufacturing process related entity 326 that can be employed to facilitate in retrieving data parameters 314 even though the manufacturing process system 318 is not the recipient of the requested data. Likewise, for example, the manufacturing report system 320 and/or the manufacturing chart system 322 can be employed to generate the data parameters 314 to facilitate in reviewing troubleshooting data on a process overview display that employs the unified process data 308. The data parameters 314 can be obtained from any combination of user 316, manufacturing related systems/subsystem 318-324, and manufacturing process related entity 326. This substantially facilitates current techniques employed in manufacturing processes.

Currently, manufacturing control and monitoring systems can separately access real-time (i.e., live) and historical data. For example, HMI displays can only show the current state of process variables to an operator. If displaying historical trend objects is desired, they can only be displayed by utilizing separate means that independently retrieve historical data from a persistent store such as a database or log file. For example, trend object users can "pan" backwards in time in a line graph plotting some process variable against time to instances of the process variable that were captured (and stored) at some point in history (e.g., "last week"). They cannot, however, view this data on a current overview process display. Thus, HMI displays themselves—typically in the form of process overviews or machine detail displays—can only show real-time (or last known) values to an operator. Apart from historical trend objects, there is no way for a user to view the state of all the other objects in an HMI display (e.g., tank levels, numeric display objects, etc.), as they may have existed at some point in history (i.e., when populated with historical data).

If operators could "record and playback" HMI displays with historical data, they could (among other things) determine what "state" their process was in prior to some problem occurring (or look at process variables when a process was running properly and compare them to a malfunctioning system). All of this would be possible without having to browse through tables of logged data. For example, it can be done simply by "scrolling back" in time within an operator display.

Figure 4:
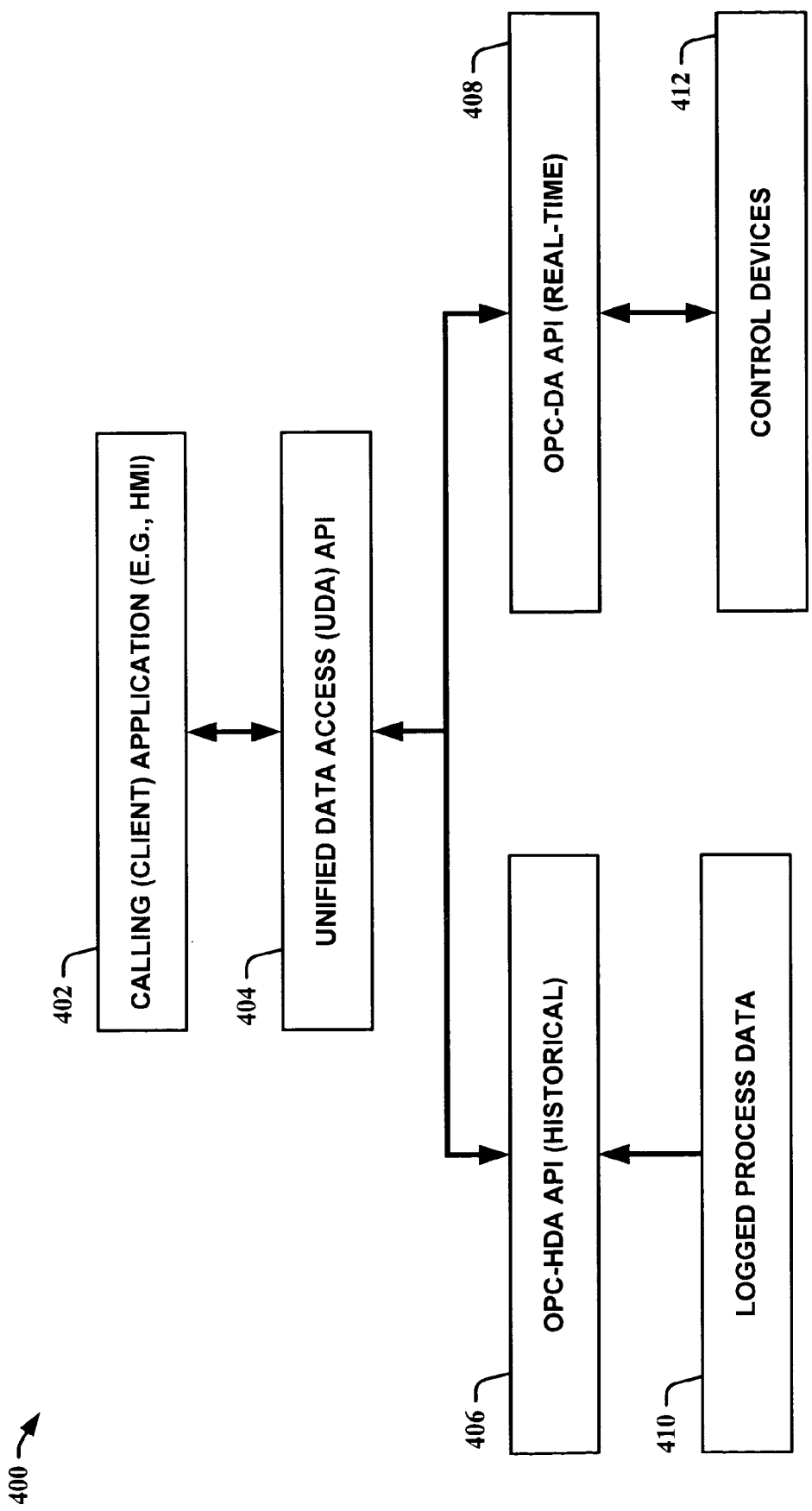
FIG. 4 is an illustration of an example application of a unified data access means in accordance with an aspect of an embodiment.

Referring to FIG. 4, an illustration of an example application 400 of a unified data access means in accordance with an aspect of an embodiment is shown. This instance of the systems and methods disclosed herein provides a system and method for unifying the access to disparate, historical and/or real-time data servers (e.g., logged process data 410 and control devices 412, respectively) in an HMI system by introducing a "unified data access" (UDA) API 404 that abstracts the differences between the OLE for Process Control (OPC) Data Access (OPC-DA) 408 and the OPC-Historical Data Access (OPC-HDA) 406 Application Programming Interfaces (API's) into a single API 404 that allows seamless access to either type (real-time or historical) of data from the calling application (e.g., HMI) 402.

The calling application 402 (HMI, report engine, recipe system, etc.) binds to the UDA API 404 by supplying a bind context (which data it would like to obtain), a maximum update rate, and a starting time (if none is specified, the system can select a default such as, for example, real-time data). With this information, the UDA API 404 connects to either (or both) of the OPC-DA API 408 and OPC-HDA API 406 interfaces—using each API's specifics—and returns a collection of data returned by these servers to the calling application 402. In the case of real-time data, the UDA API 404 can continue to update the calling application 402 whenever new updates arrive from the underlying OPC-DA system. If the user wishes to view an HMI display with historical data, they can, for example, simply press a VCR-style "back" button on the display and/or specify a start time and the UDA API 404 can request this data from the OPC-HDA API 406. If data records exist in the logged data that match the start time specified, these records can be returned to the calling application (HMI) 402 via the UDA API 404.

Figure 5:
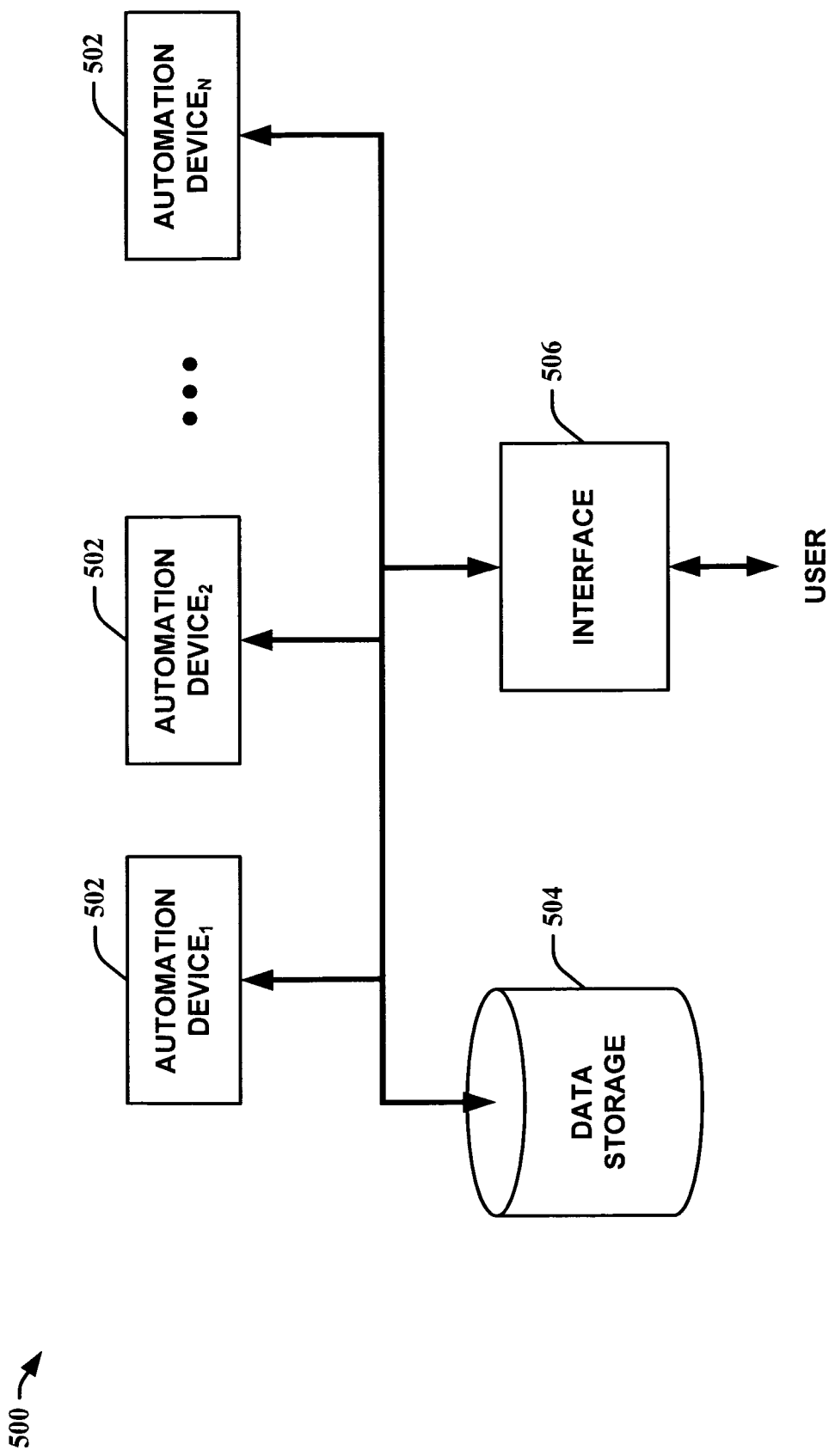
FIG. 5 is a block diagram of an industrial automation system in accordance with an aspect of an embodiment.

Looking at FIG. 5, a block diagram of an industrial automation system 500 in accordance with an aspect of an embodiment is shown. The industrial automation system 500 is comprised of one or more automation device(s) 502 (AUTOMATION DEVICE$_1$ through AUTOMATION DEVICE$_N$, where N is an integer from one to infinity), data storage 504 and interface 506. Automation device(s) 502 can include any one of a plurality of industrial processes and machines such as programmable logic controllers (PLCs), pumps providing fluid transport and other processes, fans, conveyor systems, compressors, gear boxes, motion control and detection devices, sensors, screw pumps, and mixers, as well as hydraulic and pneumatic machines driven by motors. Such motors can be combined with other components, such as valves, pumps, furnaces, heaters, chillers, conveyor rollers, fans, compressors, gearboxes, and the like, as well as with appropriate motor drives to form industrial machines and actuators. For example, an electric motor could be combined with a motor drive providing variable electrical power to the motor, as well as with a pump, whereby the motor rotates the pump shaft to create a controllable pumping system.

Data storage 504 provides a storage location for housing data relating to automation device(s) 502 including but not limited to device description, location, and mechanical condition, energy or fuel consumption, completed cycles, horsepower, average RPM, efficiency rating, as well as data from sensors regarding device health and/or performance. The data storage 504 can be integrated or federated and linked by a communication system. Interface 506 is operable to connect users with a network of automation devices 502 and/or data storage 504 via a wire (e.g., twisted pair, coaxial cable, optical fiber, Ethernet, USB (Universal Serial Bus), FireWire) or wirelessly (e.g., using IEEE 802.11a and/or IEEE 802.11b standards, Bluetooth technology, satellite). Interface 506 facilitates monitoring, extracting, transmitting, and otherwise interacting with automated device(s) 502 and associated data.

As shown in FIG. 5, a user such as, for example, a device operator can connect to data storage 504 and automation devices 502 over a local area network (LAN) utilizing a variety of LAN technologies, including Fiber Distributed Data Interface (FDDI), Copper Distributed Data Interface (CDDI), Ethernet/IEEE 802.3, Token Ring/IEEE 802.5, physical connection topologies such as bus, tree, ring, and star, and the like. However, communications between networked devices such as automation devices 502, data storage 504, and interface 506 need not be limited to those devices connected locally to a network. Local networked devices can also communicate to and from remote devices.

Figure 6:
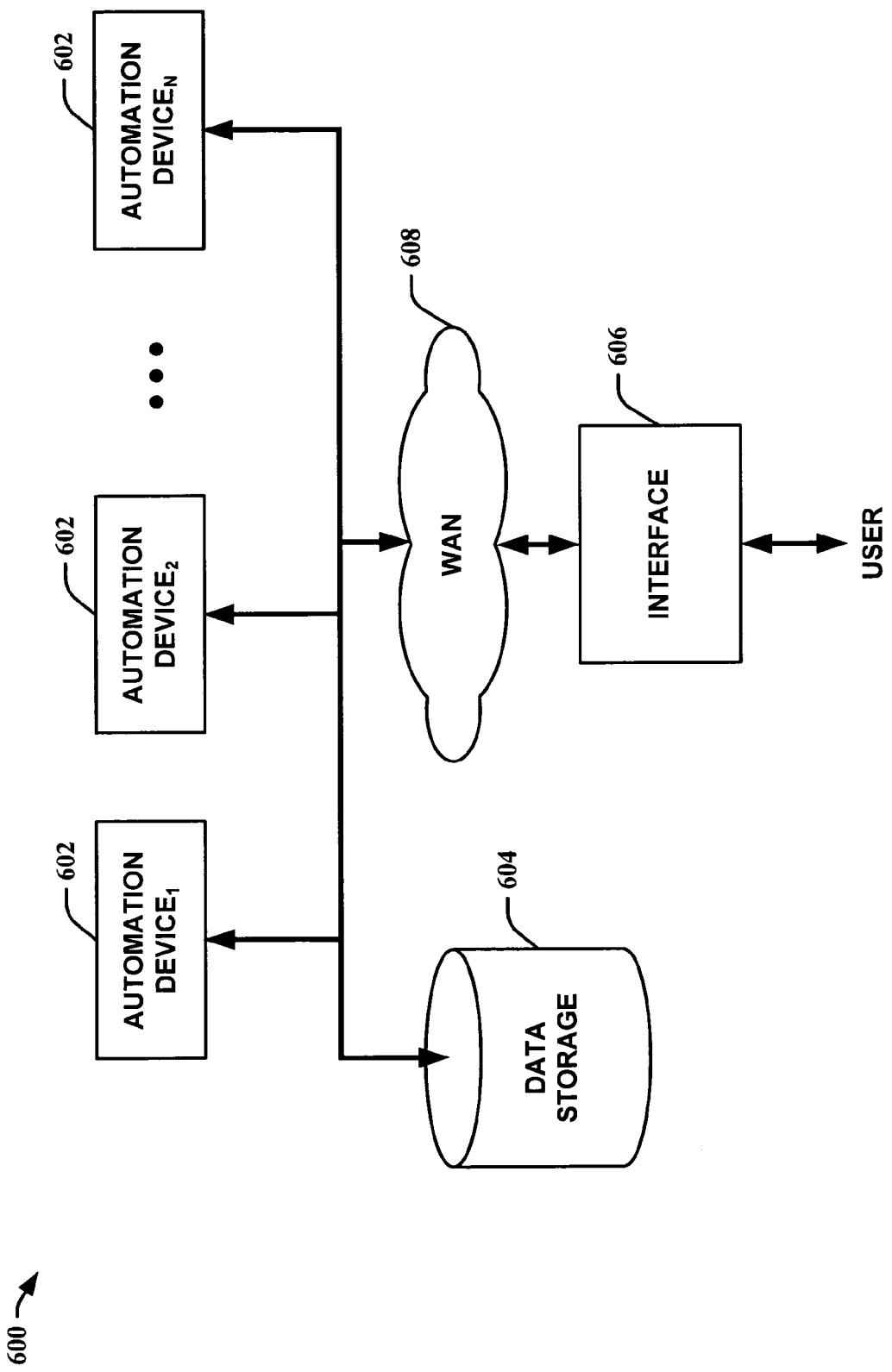
FIG. 6 is another block diagram of an industrial automation system in accordance with an aspect of an embodiment

Turning to FIG. 6, another block diagram of an industrial automation system 600 in accordance with an aspect of an embodiment is depicted. FIG. 6 is substantially the same as system 500 except that a user employs interface 606 to interact with automation devices 602 and data storage 604 remotely over a wide area network (WAN) 608. WANs 608 are communication networks that span a large geographic area (e.g., nationwide, worldwide) and generally consist of the several interconnected local area networks (LANs) and metropolitan area networks (MANs). The largest WAN 608 in existence today is the Internet. WAN technologies include, but are not limited to, point-to-point links, circuit switching networks like Integrated Services Digital Networks (ISDN) and variations thereon, packet switching networks, T1 networks, and Digital Subscriber Lines (DSL).

Figure 7:
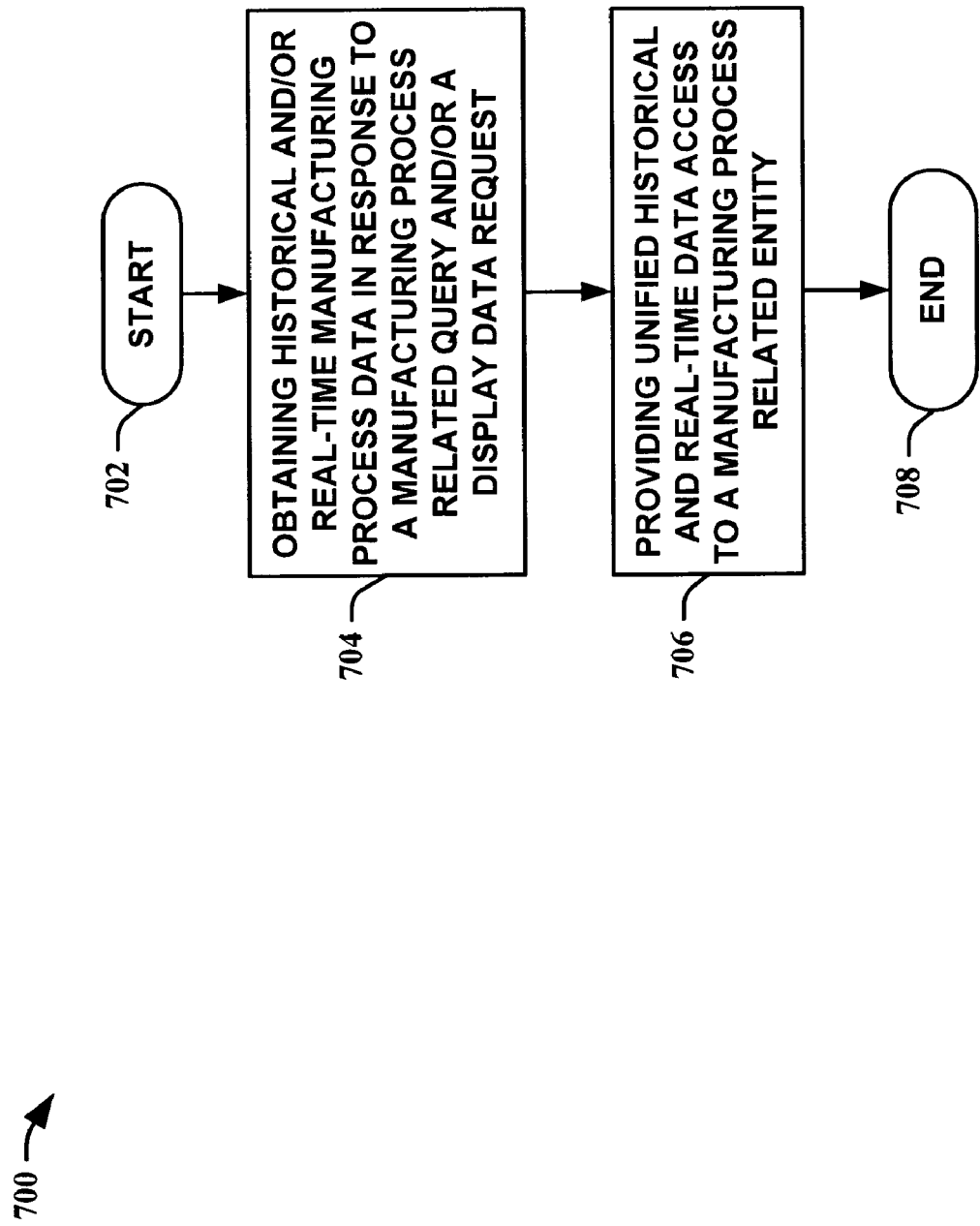
FIG. 7 is a flow diagram of a method of providing unified data access for a manufacturing process in accordance with an aspect of an embodiment.
Figure 8:
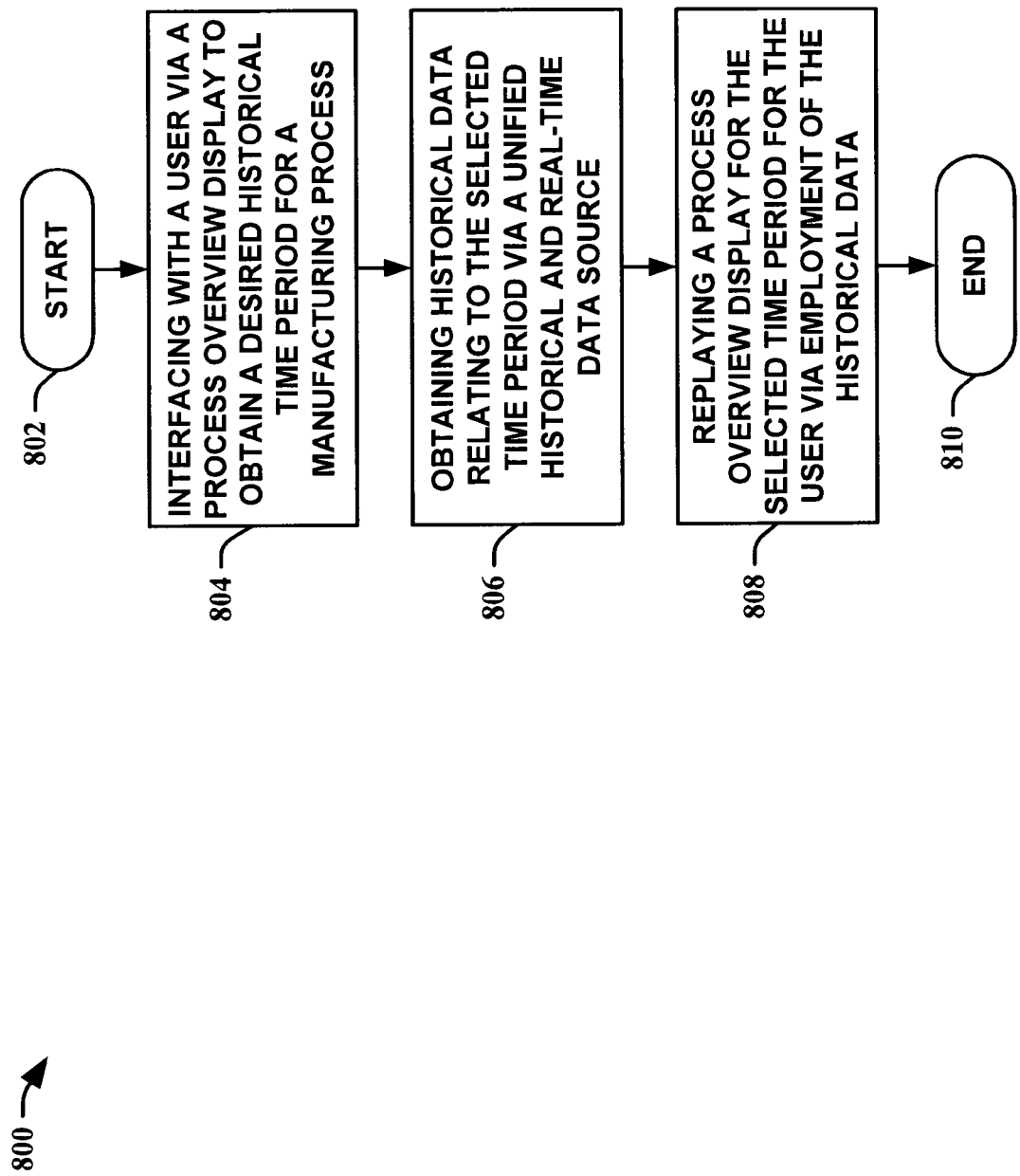
FIG. 8 is a flow diagram of a method of providing unified data access for a manufacturing process overview display in accordance with an aspect of an embodiment.
Figure 9:
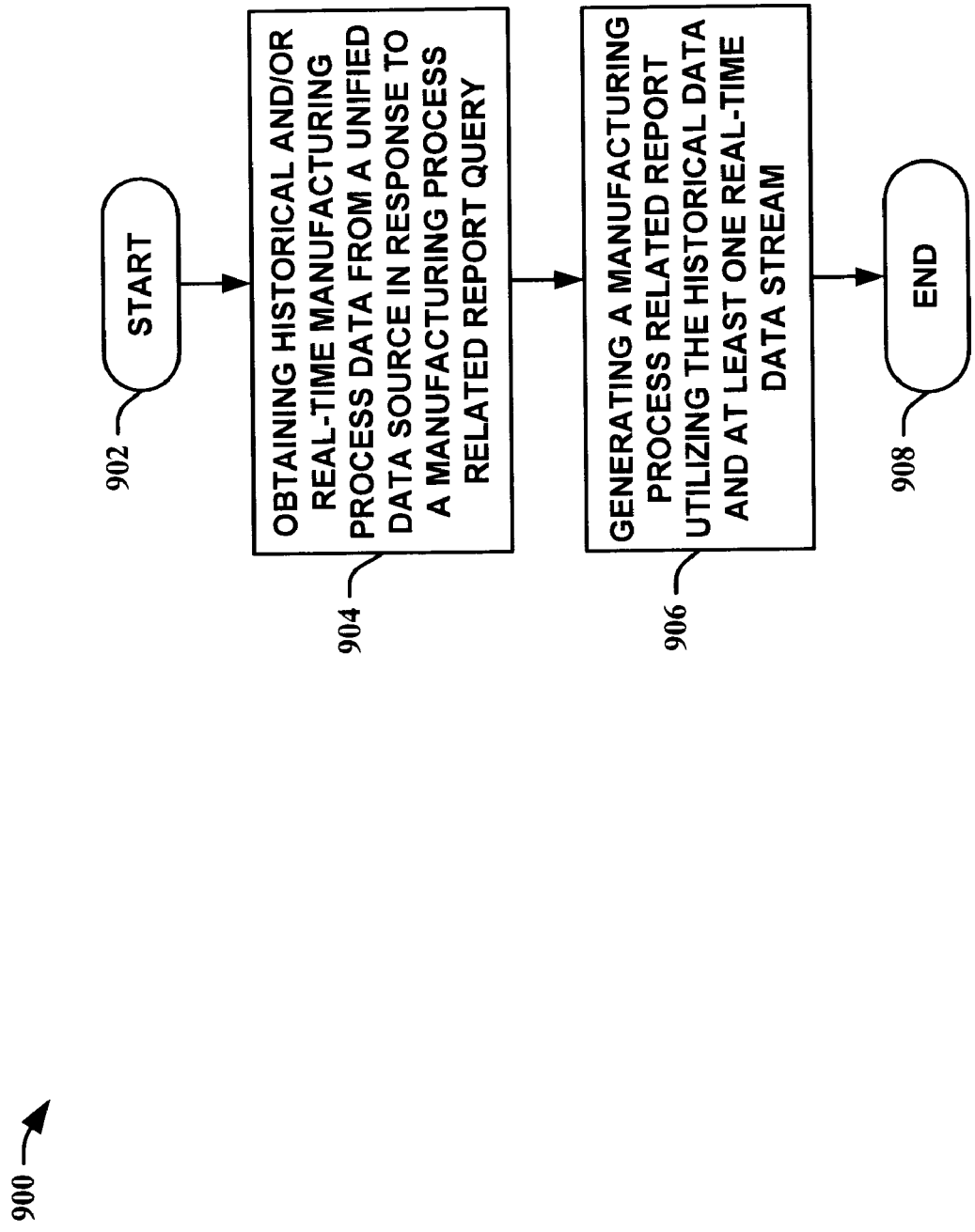
FIG. 9 is a flow diagram of a method of generating a living report utilizing unified data access for a manufacturing process in accordance with an aspect of an embodiment.

In view of the exemplary systems shown and described above, methodologies that may be implemented in accordance with the embodiments will be better appreciated with reference to the flow charts of FIGS. 7-9. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

In FIG. 7, a flow diagram of a method 700 of providing unified data access for a manufacturing process in accordance with an aspect of an embodiment is shown. The method 700 starts 702 by obtaining historical and/or real-time manufacturing process data in response to a manufacturing process related query and/or a display data request 704. The historical data can be obtained from, for example, data servers, databases, and/or data files and the like. The real-time data can be obtained from, for example, manufacturing processes and/or buffered process data (e.g., current data in random access memory (RAM) and the like). Requests can come from, for example, process overview displays, charting systems, reporting systems, logging systems, and/or recipe systems and the like. A unified historical and real-time data access is then provided to a manufacturing process related entity 706, ending the flow 708. For example, this can be accomplished by employing a unified data access (UDA) application programming interface (API) that abstracts the differences between the OLE for Process Control (OPC) Data Access (OPC-DA) and the OPC-Historical Data Access (OPC-HDA) API's into a single API that allows seamless access to either type (real-time and/or historical) of data from the calling application (i.e., manufacturing process related entity).

Looking at FIG. 8, a flow diagram of a method 800 of providing unified data access for a manufacturing process overview display in accordance with an aspect of an embodiment is depicted. The method 800 starts 802 by interfacing with a user via a process overview display to obtain a desired historical time period for a manufacturing process 804. The time period can be an approximation such as, for example, "around 12pm yesterday" and the like as well as a specific time period, for example, "from 1pm to 3pm on Tuesday of last week." The time period can also, for example, include only a start time such as "start playback at 4pm two days ago" and the like. Historical data relating to the selected time period is then obtained via a unified historical and real-time data source 806. This can be accomplished, for example, via utilization of a unified data access API described supra. A process overview display for the selected time period is then replayed for the user via employment of the historical data 808, ending the flow 810. In one instance, the manufacturing process overview display employs 'VCR-like' controls to facilitate in playing back the historical data on the process overview. This allows a user to easily 'rewind,' 'fast forward,' 'pause,' or 'stop,' and the like to find selected time periods to review.

Turning to FIG. 9, a flow diagram of a method 900 of generating a living report utilizing unified data access for a manufacturing process in accordance with an aspect of an embodiment is illustrated. The method 900 starts 902 by obtaining historical and/or real-time manufacturing process data from a unified data source in response to a manufacturing process related report query 904. The historical data can be obtained from, for example, data servers, databases, and/or data files and the like. The real-time data can be obtained from, for example, manufacturing processes and/or buffered process data (e.g., current data in random access memory (RAM) and the like). The unified data source can be, for example, a unified data access API described supra. A manufacturing process related report is then generated utilizing the historical data and at least one real-time data stream 906, ending the flow 908. The generated report includes a continuously updated real-time data component. This effectively produces a "living" report that is always current. This allows, for example, a constant comparison of historical data with current data. In one instance, the report is an Internet web page that indicates both historical and current data for at least one data parameter of a manufacturing process.

Figure 10:
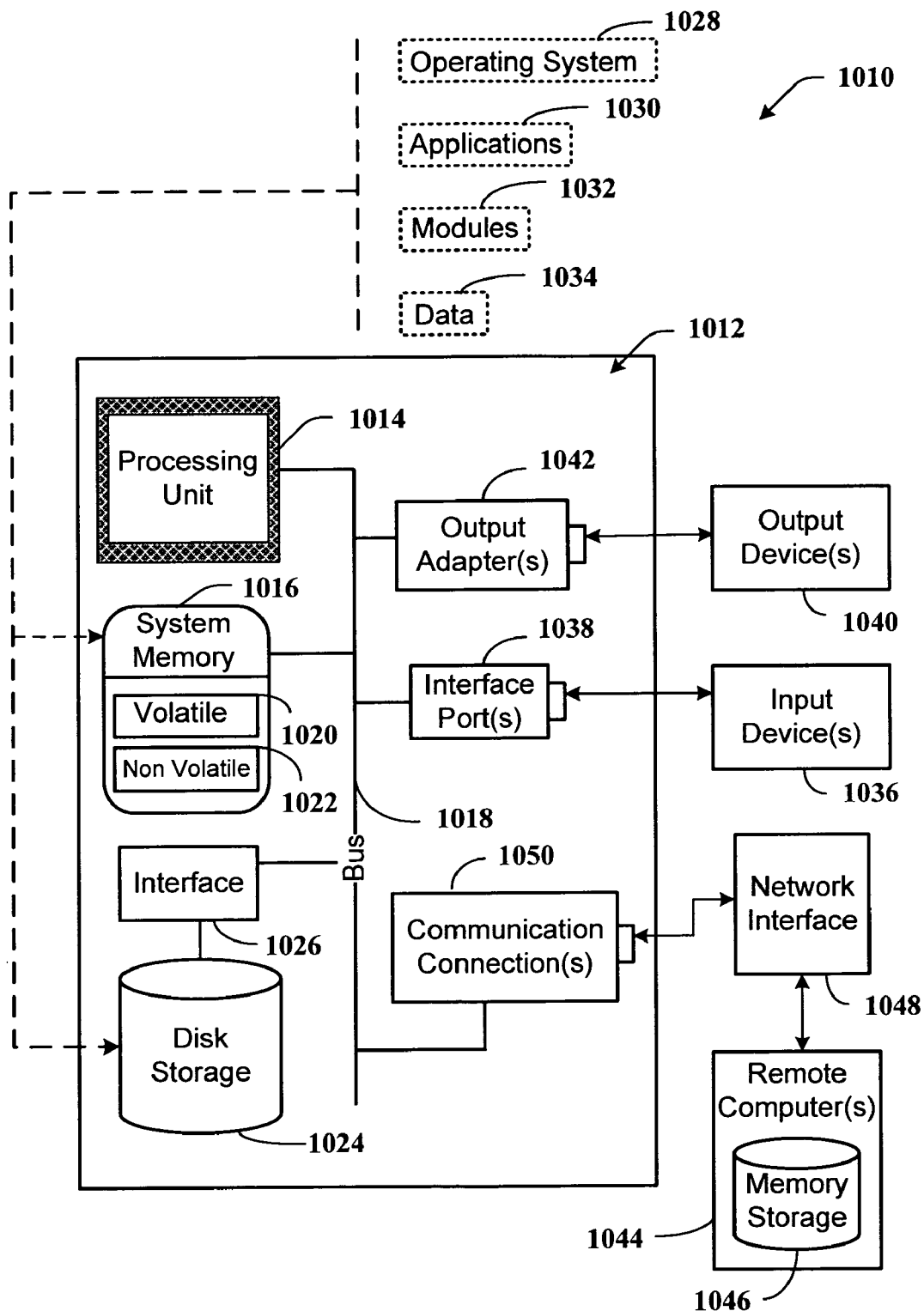
FIG. 10 illustrates an example operating environment in which an embodiment can function.

In order to provide additional context for implementing various aspects of the embodiments, FIG. 10 and the following discussion is intended to provide a brief, general description of a suitable computing environment 1000 in which the various aspects of the embodiments can be implemented. While the embodiments have been described above in the general context of computer-executable instructions of a computer program that runs on a local computer and/or remote computer, those skilled in the art will recognize that the embodiments can also be implemented in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, handheld computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and a computer. By way of illustration, an application running on a server and/or the server can be a component. In addition, a component can include one or more subcomponents.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI.

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
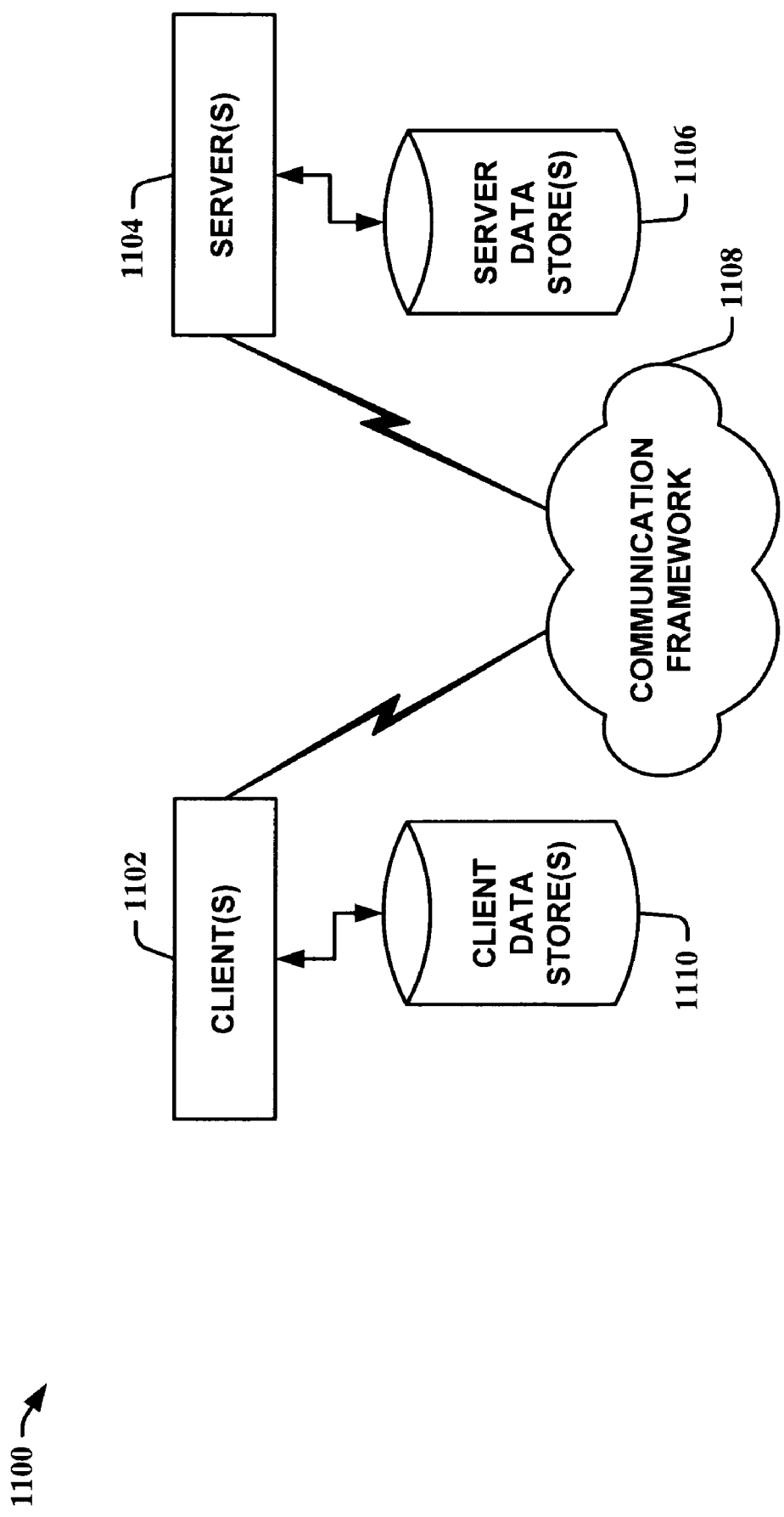
FIG. 11 illustrates another example operating environment in which an embodiment can function.

FIG. 11 is another block diagram of a sample computing environment 1100 with which embodiments can interact. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). One possible communication between a client 1102 and a server 1104 can be in the form of a data packet adapted to be transmitted between two or more computer processes. The system 1100 includes a communication framework 1108 that can be employed to facilitate communications between the client(s) 1102 and the server(s) 1104. The client(s) 1102 are connected to one or more client data store(s) 1110 that can be employed to store information local to the client(s) 1102. Similarly, the server(s) 1104 are connected to one or more server data store(s) 1106 that can be employed to store information local to the server(s) 1104.

In one instance of an embodiment, a data packet transmitted between two or more computer components that facilitates monitoring and/or control of a manufacturing process is comprised of, at least in part, information relating to a unified data access system that provides, at least in part, retrieval of historical process data and/or real-time process data related to at least one manufacturing process.

It is to be appreciated that the systems and/or methods of the embodiments can be utilized in unified data access facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates monitoring and/or control of a manufacturing process, comprising:
    a data retrieval component employed in a human machine interface (HMI) that retrieves historical data and real-time data associated with a manufacturing process in an industrial automation environment from disparate data sources, the data retrieval component retrieves the historical data from a database or a data file by employing a first protocol, the data retrieval component retrieves the real-time process data from the manufacturing process in real-time employing a second protocol;
    a unified data access component that abstracts differences between the retrieved historical data and the retrieved real-time data to provide unified process data; and
    a process overview display that utilizes the unified process data to provide the real-time data and historical data at the HMI in the same format, and playback of historical process overviews at the HMI, wherein the playback includes playback over a user selected time period.

2. The system of claim 1, the manufacturing process related entity comprising a manufacturing process related software application.

3. The system of claim 2, the manufacturing process related software application comprising at least one of a manufacturing process report generating application a manufacturing process chart generating application.

4. The system of claim 3, the manufacturing process report generating application provides a report that includes at least one continuously updated data component, wherein the data component is updated with the real-time data stream.

5. The system of claim 4, the report comprising a web page.

6. The system of claim 1, the process overview display provides a simultaneous display of historical and real-time manufacturing process data.

7. An application programming interface (API) that employs the system of claim 1.

8. A method for facilitating monitoring and/or control of a manufacturing process, comprising:
    obtaining historical and real-time data at a human machine interface (HMI) employed by a manufacturing process related entity, the data associated with a manufacturing process in an industrial automation environment, in response to a manufacturing process related query and/or a display data request, the historical data retrieved from a database or a data file by employing a first protocol, the real-time process data retrieved from the manufacturing process employing a second protocol;
    providing the historical data and the real-time data, to a unified data access component that abstracts the differences and unifies the historical and real-time data to provide unified process data via a single interface to the HMI of the manufacturing process related entity, wherein a unified data access API (application programming interface) generates a report utilizing the historical data and at least one real-time data, the real-time data component in the generated report is continuously updated; and
    providing a historical data playback mechanism that utilizes the unified process data to provide a playback of historical process overviews at the HMI and allows a user to review the historical data in a format similar to viewing real-time data.

9. The method of claim 8, the manufacturing process related entity comprising at least one of a data logging system, a report generating system, a chart generating system, a statistical analysis system or a recipe system.

10. The method of claim 8 further comprising:
interacting with a user to display manufacturing process overviews relating to a user selected historical time period.

11. The method of claim 10 further comprising:
displaying a manufacturing process overview that includes historical and real-time data.

12. The method of claim 8 further comprising:
displaying the historical and real-time data via a web page.

13. The method of claim 8 further comprising:
displaying real-time and historical data in a comparative fashion.

14. The method of claim 8 further comprising:
generating a report utilizing historical data from a database query and real-time data from a manufacturing process.

15. The method of claim 8 further comprising:
displaying recipe values along with the historical data for a user selectable time period to facilitate in troubleshooting a manufacturing process.

16. A system that facilitates monitoring and/or control of a manufacturing process, comprising:

means for retrieving historical data from a database or a data file employing a first protocol and real-time data from a manufacturing process employing a second protocol, at a human machine interface (HMI) employed by a manufacturing process related entity, the data associated with a manufacturing process in an industrial automation environment; and means for providing the historical data and the real-time data, to a unified data access component that abstracts differences between the historical and real-time data and unifies the data to provide unified process data via a single interface to the HMI of the manufacturing process related entity to facilitate seamless access to the real-time and historical data; and means for providing a process overview display that utilizes the unified process data to provide the real-time data and historical data at the HMI in the same format, and playback of historical process overviews, wherein the playback includes playback over a user selected time period.

17. A device employing the method of claim 16 comprising at least one selected from the group consisting of a computer, a server, and a handheld electronic device.

18. A device employing the system of claim 16 comprising at least one selected from the group consisting of a computer, a server, and a handheld electronic device.

* * * * *